May 11, 1937.  J. T. MARVIN  2,080,373
RELIEF VALVE
Filed July 16, 1934  2 Sheets-Sheet 1

INVENTOR
John T. Marvin
BY
ATTORNEY

May 11, 1937.  J. T. MARVIN  2,080,373
RELIEF VALVE
Filed July 16, 1934  2 Sheets-Sheet 2

INVENTOR
John T. Marvin
BY
ATTORNEY

Patented May 11, 1937

2,080,373

UNITED STATES PATENT OFFICE 2,080,373

RELIEF VALVE

John T. Marvin, Fairview Village, Ohio, assignor to The Patrol Valve Company, Cleveland, Ohio, a corporation of Ohio Application July 16, 1934, Serial No. 735,315

3 Claims. (Cl. 122—504.3)

This invention relates to relief valves, and has for its more specific objective the formation of a relief valve combining the functions of relieving excessive pressure, temperatures, and vacuums in a container, and additionally cutting off the supply of fuel to the heating element employed with the container.

In addition, the device acts simultaneously to cut off the fuel supply upon operation of the temperature relief mechanism.

It is of advantage to combine the temperature and pressure relief mechanism with a fuel cut-off. This combination immediately cuts off the burner and prevents continued heating of the water after the temperature or pressure relief valve opens. The valve is valuable either with or without the ordinary thermostatic fuel cut-off. Without the latter, there is no means to cut-off the fuel in case of excess temperature or in case the thermostat does not operate properly, unless the valve of this invention is used. With the thermostat, after the relief valve has functioned, the tank contents may cool so that the thermostat reopens the burner valve to reheat the contents unless an added check, such as the present valve, is used. Where the relief valve, as is frequently the case, is not of a reseating character, such as the one herein shown, reheating of the contents is a waste of fuel, as the heated water may flow from the open temperature relief passage.

It will be observed that this valve also gives notice to the users of the heater that the relief valve has opened, by the cessation of the supply of hot water.

Consequently it will be seen from the above discussion, together with the description given below, that a valve has been provided, combining in one body the four enumerated functions.

The device is to be described as employed on a gas water heater, but it is to be understood that it is capable of application to many other devices and systems.

Figure 1:
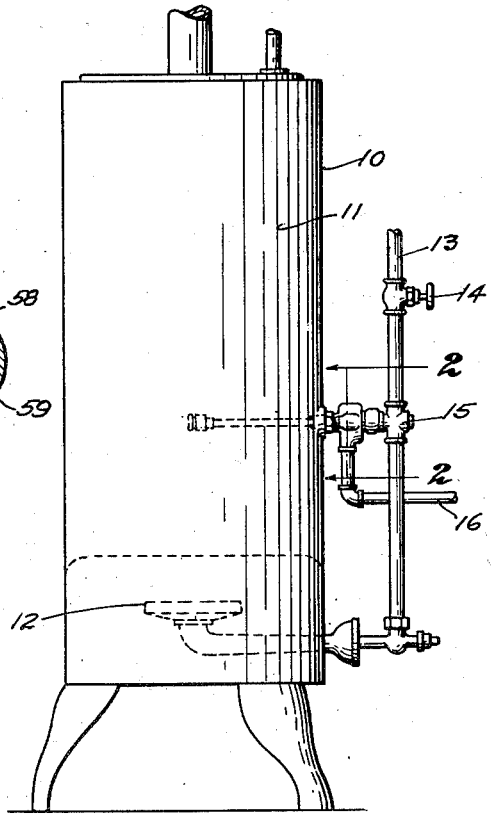
Figure 1 shows a heater with the valve installed thereon.

Referring to Figure 1, 10 indicates a tank water heater having a water supply reservoir 11, the water in which is heated by burner 12. Fuel is supplied to burner 12 through fuel line 13. A manual valve 14 may be installed in the fuel line as shown. A control valve 15, forming the essence of this invention, is located in fuel line 13, is secured to tank 10 and has an extension inside reservoir 11. An overflow pipe 16 leads from the valve 15 to conduct the overflow from the reservoir.

In the detailed views, 15 designates the valve in general. The fuel line intake is shown at 17 and the outlet at 18, the latter leading to burner 12. Intermediate the inlet and the outlet is a partition wall having a valve seat 19 therein, the same being controlled by a valve head 20. The valve head 20 is connected to valve stem 21 by such means as the ball joint 22. A composition washer or the like, 23, is inserted in the valve head to form a sealing means therefor. The valve 20 with its associated structure, is inserted into position through an opening 24 in the valve body, the same being closed by plug 25. Engaging against the plug 25 and the valve head 20 is a spring 26 urging the valve head into closed position against seat 19. The above described parts of the valve are mounted in a housing member 27 in the end of which is a packing gland 28, compression of which is provided by threaded plug 29 to be screwed into the end of housing 27 by means such as a spanner wrench engageable in holes 30. The housing 27 is secured to a waste valve body 31 by a union 32.

Housing 31 has formed integrally therewith a threaded extension 33 designed to be screwed into the reservoir 11. The extension 33 is provided with a passage as at 34, the passage extending into housing 31 as shown. Into the end of this passage is threaded a plug 35 having secured therein tube 36 extending out into the reservoir 11 where it may be affected by the heat condition of the reservoir. This tube has an end portion 37 secured thereto, threaded to the outer end of which portion is a collar 38 with a plug 39 therein.

As will be seen, the valve stem 21 of valve 20 extends through tube 36 and engages against plug 39, the plug acting to hold the valve open. This plug 39 is made of some material adapted to fuse upon being heated to some predetermined temperature.

Extending from the passage 34 are two openings 45 and 46. Opening 45 leads into chamber 47 in housing 31, which chamber communicates as by passage 48 with a larger chamber 49 to which is connected waste pipe 16. Passageway 45 is normally closed by valve 50 having a composition sealing element 51. The valve 50 is pressed against valve seat 52 by a spring 53. The chamber 47 is provided with an outlet to the atmosphere as at 54 which outlet is normally closed by an adjustable plug 55 and a cap member 56 both of which are threaded to the walls of the chamber as shown. Plug 54 has therein openings 57 to receive a spanner wrench for turning the plug into the passageway. The plug is likewise provided with an opening 58 whereby it acts as a guide member for valve stem 59 of valve 50. As will be seen spring 53 surrounds valve stem 59 and abuts against the valve 50 into plug 55.

Figure 2:
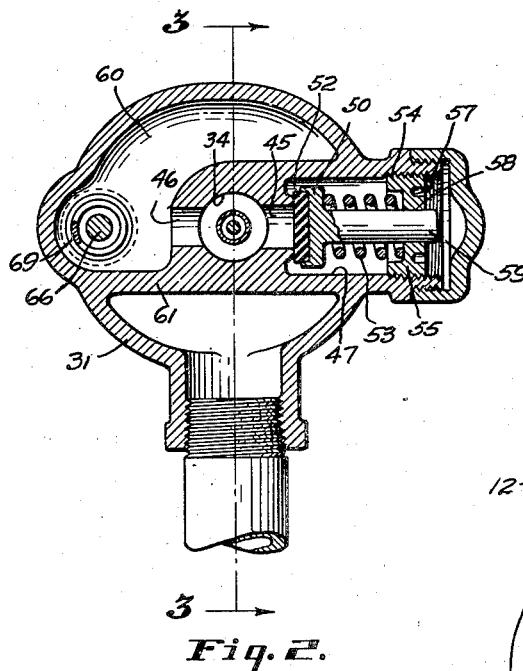
Figure 2 is a section on the line 2—2 of Figure 1.
Figure 3:
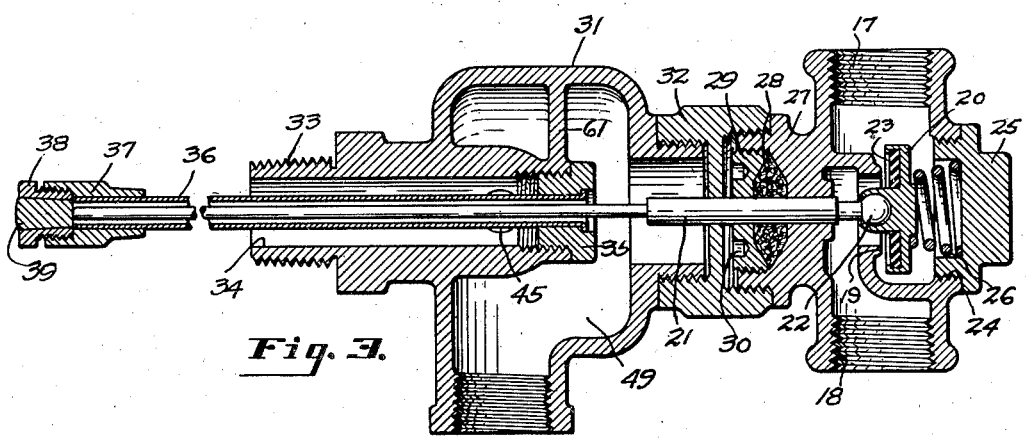
Figure 3 is a section on the line 3—3 of Figure 2, showing a longitudinal section in elevation.
Figure 4:
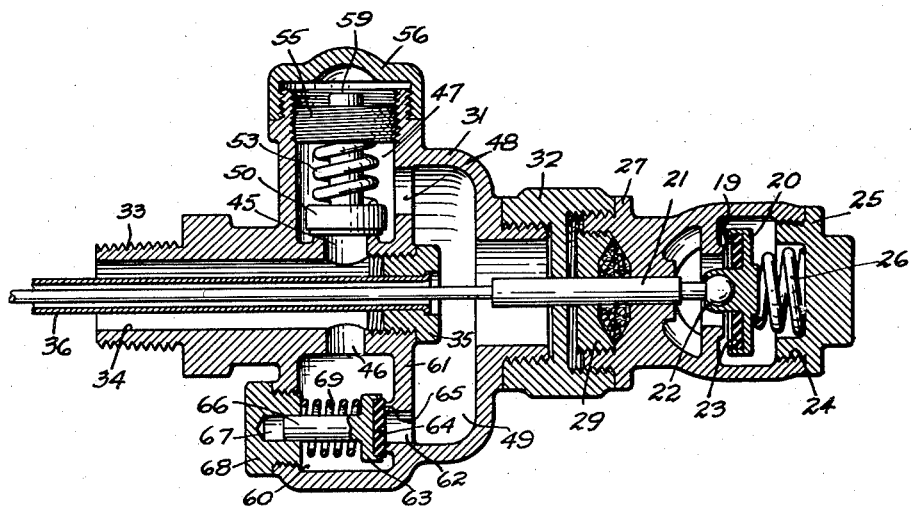
Figure 4 is a plan section taken longitudinally of the valve with the heat responsive member not shown.

Opening 46 extends from the bore 34 to a chamber 60 sealed by wall 61 that extends horizontally as shown in Figure 2 to form a bottom for the chamber thence upwardly as shown in Figure 3 to form a lateral wall, thus sealing chamber 60 from the space 49. Chamber 60 has an inlet passageway 62 leading from chamber 49. The port 62 is normally closed by a valve 63 having therein a composition seating element 64 engaging against valve seat 65. The valve 64 is provided with a stem 66 operable in a guide opening 67 in a plug 68 screwed into the valve body member 31. A spring 69 surrounding the valve stem 66 engages the valve head 63 and plug 68 to urge the valve into closed position. This valve is a vacuum relief valve opening when the excess of external pressure or the internal pressure reaches a predetermined amount.

The operation of the valve is as follows:

When the temperature within the reservoir 11 reaches a predetermined amount the plug 39 fuses and in melting permits the fuel valve stem 21 to move to the left, as shown in Figure 3, so that the valve 20 closes against seat 19 shutting off the supply of fuel to burner 12. Valve 20 is closed under the action of spring 26. At the same time, with the removal of plug 39, the overheated water within the reservoir 11 may escape through tube 36 and out into the chamber 49, and thence into waste pipe 16. In case the pressure within the reservoir 11 exceeds the predetermined safe amount, it will unseat valve 50 so that water may escape through passage 34, opening 45 and into chamber 47. It thence passes through opening 48, chamber 49, and into the waste pipe 16.

In case the reservoir 11 becomes evacuated so that the external pressure is greater than the pressure within the reservoir by a predetermined dangerous amount this pressure acts in space 49 to unseat valve 63, permitting the flow of air or the like through passageway 62 into chamber 60, thence into opening 46 and passage 34 into reservoir 11 to relieve the low pressure condition therein.

To reset the valve the union 32 is unscrewed, and the gas valve assembly is removed. The plug 35 may then be removed, bringing with it the tube 34. A new plug 38 containing a fusible element is then placed in tube 34 and the device reassembled. Of course, instead of replacing plug 38, a new fusible element may be fastened into the original plug, but the first way is simpler since the replacement plugs may be obtained from the manufacturer, and their installation requires only a wrench and does not involve fusing a new element 39 into place.

When it is necessary to reseat or in anywise change the assembly of valve 20, plug 25 may be removed and the parts of the valve 20 withdrawn through opening 24. Likewise packing 28 may be adjusted or replaced by unscrewing the valve housing 27 from union 32 whereupon the packing gland is immediately accessible. Furthermore by removing union 32 from housing 31 plug 35 and associated tube 36 may be readily removed or adjusted.

Valve 50 is accessible by removal of cap 56 and plug 55. The tension of spring 53 may be adjusted by screwing plug 55 into or out of outlet 54.

Adjustment or replacement of valve 63 is in like manner attained by removal of plug 68 whereupon all of the valve structure of valve 63 may be removed from the housing.

It will thus be seen that each of the three valves is readily accessible by virtue of having a plug opening spaced opposite the valve.

Figure 5:
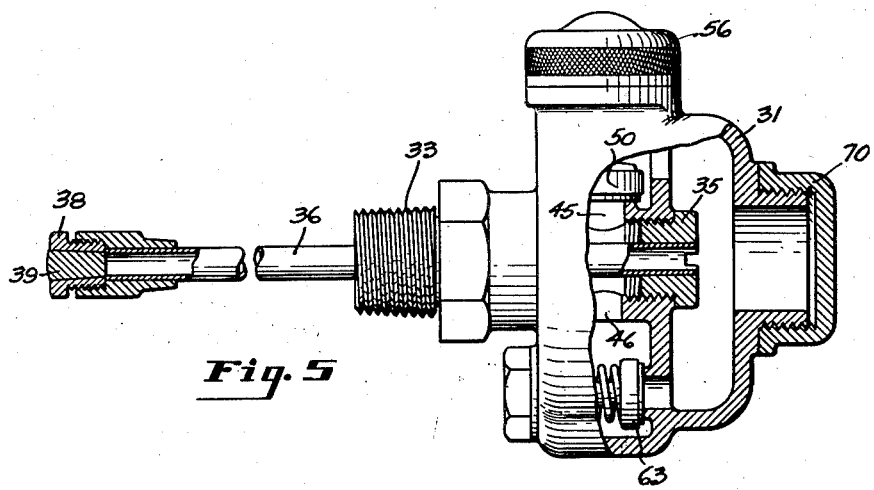
Figure 5 shows a modification of the device with the fuel control valve element eliminated.

As shown in Figure 5 the valve may be employed as a simple temperature, pressure and vacuum relief valve by eliminating housing 27 and union 32 from valve housing 31 and plugging up the opening by a cap such as cap 70. Except for this elimination of parts the valve shown in Figure 5 is identical with that in the previous figures.

From the above description it will be seen that a very compact valve has been designed and which provides temperature, pressure and vacuum relief for the contents of a tank. In addition there has been provided a cut-off of the fuel to the burner operable when the heat of the tank contents reaches a predetermined maximum, or upon operation of the temperature relief mechanism.

It will further be seen that a valve of this type has been provided in which all of the individual valve elements are readily accessible, and one wherein the fuel cut-off elements may be removed when such are not needed.

The above description has been applied to a water heater with gaseous fuel. It is to be understood that the device is applicable to many other similar systems. In the appended claims where the terms "valve" or "cut-off" are used they are to be understood to include any similar cut-off, such as an electrical switch or the like. Where the term "heat responsive element" is used it is to be understood to include heat responsive means other than a fusible plug, such as a bellows or a bi-metal. Where the expression "means responsive to physical changes" is used it is understood to have its broadest sense to include such for example as a means responsive to pressure changes.

Having described my invention what I claim is:

1. In combination, safety mechanism for attachment to a pressure tank comprising a tubular member communicable with the interior of the tank to relieve the latter of abnormal conditions through said tube, fusible means closing the inner end of said tubular member, a body member secured to the outer end of said tubular member, said body member having an outlet opening therein, an operating device within said tubular member and bearing upon said fusible means, and means actuating such operating device upon the fusing of said fusible means to completely remove the latter from the said tubular means and establish communication to the tank interior through said tubular member.

2. In combination, safety mechanism for attachment to a pressure tank comprising a tubular member communicable with the interior of the tank to relieve the latter of abnormal conditions through said tube, a body member secured to the outer end of said tubular member, said body member having an outlet opening therein, fusible means closing the inner end of said tubular member, said fusible means being displaceable longitudinally outwardly of the tubular member, an operating device within said tubular member and bearing upon said fusible means, and means acting upon said operating device to remove said fusible means from said tubular member upon fusing of the fusible means whereby to establish communication to the tank interior through said tubular member.

3. In combination, a safety mechanism for attachment to a heated tank comprising a body member connectible to the tank in an opening in the latter, said body member having an outlet opening therein, a tubular member secured to said body member and having one end projecting internally of the tank, said tubular member establishing communication with the tank interior to relieve abnormal temperature conditions therein, fusible means closing the projecting end of said tubular member, an operating device within said tubular member, means operable to force said operating device to completely remove from the tubular member said fusible means upon fusing thereof, a shut-off valve connectable to control a medium for heating the tank, and connections between said valve and said operating device whereby actuation of the latter effects the simultaneous relief of excessive temperature in the tank and the shutting off of its heating medium.

JOHN T. MARVIN.